United States Patent [19]
Cipriano et al.

[11] Patent Number: 5,525,642
[45] Date of Patent: Jun. 11, 1996

[54] ELECTRORESPONSIVE POLYMER SYSTEMS

[75] Inventors: Robert A. Cipriano; Jose J. Longoria, both of Lake Jackson, Tex.

[73] Assignee: The Dow Chemical Company, Midland, Mich.

[21] Appl. No.: 707,731

[22] Filed: May 30, 1991

[51] Int. Cl.[6] ........................... C08J 5/14
[52] U.S. Cl. .................. 523/149; 192/84 E; 192/21.5; 524/538
[58] Field of Search ............ 523/149; 192/84 E, 192/21.5; 524/538

[56] References Cited

U.S. PATENT DOCUMENTS

| | | |
|---|---|---|
| 3,343,636 | 9/1967 | Donelan et al. .......... 192/84 E |
| 3,871,944 | 3/1975 | Dominguez-Burguette .......... 161/42 |
| 4,393,967 | 7/1983 | Cuomo et al. .......... 192/84 E |
| 4,617,162 | 10/1986 | Von Rex et al. .......... 264/176 R |
| 4,661,634 | 4/1987 | Vaughn et al. .......... 564/292 |
| 4,747,476 | 5/1988 | East et al. .......... 192/107 M |
| 4,777,193 | 10/1988 | Kani .......... 523/153 |
| 5,093,057 | 3/1992 | Hara et al. .......... 264/112 |

*Primary Examiner*—Paul R. Michl
*Assistant Examiner*—John J. Guarriello
*Attorney, Agent, or Firm*—Bruce M. Kanuch

[57] ABSTRACT

Polymeric systems are disclosed that exhibit the Johnsen-Rahbeck effect and an electrostatic clutch for using films of these polymeric systems. The films may be pressed from the polymeric reaction product of either a polymer having an anionic functionality reacted with cations, or a polymer having cationic functionality reacted with anions. The dielectric film may be interposed between nesting, or otherwise contacting, conductive surfaces to increase the frictional force between the surfaces by the Johnsen-Rahbeck effect when a voltage differential is applied across the surfaces.

6 Claims, 2 Drawing Sheets

ELECTRORESPONSIVE POLYMER SYSTEMS

BACKGROUND OF THE INVENTION

1. Field of the Invention

This invention relates to compositions that exhibit the Johnsen-Rahbeck effect. This effect is defined as the increase in frictional force between two electrodes in contact with a semiconductor that arises when a potential difference is applied between the electrodes.

2. Description of the Related Art

A description of the early work relating to the Johnsen-Rahbeck effect may be found in "Some Theoretical and Practical Considerations of the Johnsen-Rahbeck Effect" Audrey D. Stuckes, Proceedings of the Institution of Electrical Engineers, Vol. 103 (b), 1956, pages 125–131. This article indicates that two Danish scientists, Johnsen and Rahbeck, observed that when about 400 volts was applied between plane and polished plates of lithographic stone and metal, a force of about 50 grams per square centimeter developed between these plates. This force disappeared upon removal of the voltage. By systematic investigation, these Danish scientists found that this force could be obtained with a number of minerals, including agate, limestone and marble, as well as some organic materials such as ivory, horn, bone and cellophane. It was believed that the presence of moisture was essential because only very small forces were generated when the specimens were dried. The magnitude of the force was found to vary with the electrical conductivity of the material, the degree of polish that could be given to its surface, and the direction of the current flow. When the semiconductor was negative with respect to the metal, maximum force was obtained. Further, the Stuckes article indicates that the Johnsen-Rahbeck effect could find applications in electrostatic clutches having two flat, polished surfaces, one of metal and the other of a semiconductor, held lightly in contact. Since the force of attraction is inversely proportional to the square of the distance separating the surfaces, the two clutch surfaces must be almost in physical contact before current is applied. Consequently, it is desirable that one of the polished surfaces must be able to align itself relative to the other. Upon testing, the Stuckes article indicates that the clutch breaks down after a period of time and that in almost every case this breakdown was due to wear of the metal surface. The presence of even extremely small particles produced by wear drastically alters the gap between the surfaces thereby progressively reducing the torque and ultimately rendering the clutch inoperative.

There are several clutch-type devices that use this Johnsen-Rahbeck effect. For instance, U.S. Pat. No. 3,343,636 is directed to electrostatic clutches using the Johnsen-Rahbeck effect. One component of the clutch comprises a semiconductive member consisting of a surface layer of semiconductive material, which provides the engagable surface of the component and which is in contact either with a metal body forming the main part of the component or with an electrically conducting layer interposed between the semiconductive layer and the main body of the component, if the latter is of an insulating material. The second component of the clutch may be formed wholly of metal, or may include a metal member forming the engagable surface. The clutch is illustrated at FIGS. 1 and 2 of the patent and is composed of a plurality of separate sections, each individually mounted on a surface of the main body of the component so as to be capable of pivotal movement relative to the main body. The engagement of each of the sections is individually alienable with the engagable surface of the second component of the clutch, when the two components are in the disengaged position.

U.S. Pat. No. 4,393,967 also discloses an electrostatic clutch operable by the Johnsen-Rahbeck effect, which may be used to operate a print hammer device. The engagable surface of the drum is a semiconductive surface prepared by sputtering or vapor depositing a layer of substantially pure silicon carbide onto a conductive substrate. The resistance of the silicon carbon layer depends both on the resistivity of the silicon carbide material and the thickness of the layer. It is generally desirable that the thickness of the layer be between 10 and 2,500 micrometers, although it is possible to prepare useful clutches with silicon carbide layers of greater or lesser thickness.

At least some research has been carried out to test the utility of certain polymers in Johnsen-Rahbeck clutches. For instance, U.S. Pat. No. 3,721,649 discloses a semiconductive phthalein-fluoran polymer that, when used with an appropriate binder, such as a powdered phenolic resin precursor, is adapted for use in a friction element of an electrostatic device of the Johnsen-Rahbeck type. The patent defines semiconductors as materials that have electrical resistivity characteristics somewhere between those of insulators and metals, i.e., a resistivity between about $10^2$ and $10^{10}$ ohms-centimeters. The phthalein-fluoran semiconductor polymers are characterized as being semiconductors of the organic polymer type rather than the molecular crystal type. Semiconductive organic polymers are not well characterized, partly due to difficulty in establishing their physical-chemical structures. The patent further discloses that after prolonged periods of use, slipping between the semiconductor and metal surface causes slight wearing away of the semiconductor material. This wearing away has, in the prior art, produced dust particles which adhere to the contacting surfaces thereby accelerating wear of the semiconductive surface and shortening the useful life of the clutch. The phthalein-fluoran material is said to provide a combination of a friction element which wears during operation without the adverse production of dust particles. Any dust particles that may be produced are said to be "non-adherent" to the contacting surfaces and are "ejected" by the movement of the contacting surfaces.

U.S. Pat. No. 3,871,944 is directed to an integral composite element that is useful in electrostatic clutches or brake devices. The device disclosed includes a layer of particulate semiconductive material and a layer of highly conductive powdered metal. The entire element is integrated with a hard thermoset bonding resin. The semiconductive layer should be between 0.3 to 1.2 millimeters thick, preferably between 0.7 and 0.8 millimeters thick, to provide the appropriate Johnsen-Rahbeck effect.

There yet exists a need in the art for a semiconductive composition that, in combination with a metal opposite electrode, exhibits a high Johnsen-Rahbeck response; that can be conveniently used in doing work using the Johnsen-Rahbeck effect; and that minimizes wear of the contacting surfaces so that the Johnsen-Rahbeck device has a commercially useful service life.

SUMMARY OF THE INVENTION

The invention provides polymer matrix systems that exhibit the Johnsen-Rahbeck effect and that do not require a binder to adhere to a conductive substrate. The polymer matrix systems do not "dust" but are self-healing. Thus, the wear of the semiconductive surface with resultant loss of useful Johnsen-Rahbeck effect, that is experienced in the prior art, is substantially overcome.

The invention polymer matrix systems are prepared from polymer compositions that have anionic or cationic functionality. The polymer matrix systems may be produced from polymers containing aliphatic, aromatic or halocarbon backbones and which contain anionic or cationic functionality. The quaternary amine salts of polymers which contain anionic functionality have now been found to have resistivities in the semiconductive range ($10^{-2}$ to $10^9$ ohm-cm at room temperatures) and are highly effective in Johnsen-Rahbeck applications. This fact indicates that any large cation or anion, depending on the functionality of the polymer utilized, would be suitable for the preparation of a Johnsen-Rahbeck active polymer system. We have found that small cations like $Na^+$ or $K^+$, only yield a weak effect when combined with weak acids like a carboxylic acid. However, a stronger response is produced when these same cations ($Na^+$ or $K^+$) are combined with a strong acid such as a sulfonic acid. It is within the ambit of this invention that any salt combination which permits a significant amount of polarization to occur, when subjected to an electrical field, should result in a Johnsen-Rahbeck active system. Therefore, for systems derived from anion-containing polymers, cations of the Periodic Table Ia, IIa, Va and VIa elements are within the ambit of the present invention in producing the Johnsen-Rahbeck active systems. Similarly, for systems derived from cation-containing polymers, anions of the group VIa and VIIa elements produce Johnsen-Rahbeck active systems. The fact that the transition elements are capable of forming both anionic and cationic complexes, based on their oxidation state, also make them candidates for use with either system. Further, the salts of polymers containing aliphatic, aromatic or halocarbon backbones having cationic functionality also exhibit semiconductive properties and are effective in Johnsen-Rahbeck applications.

The polymer matrices of the invention are thermoplastic and easily molded to the shape of the end use device. They are capable of being extruded, pressed, cast or blown into films. Virtually any thickness film may be produced.

The invention semiconductive polymer systems, when pressed into flat sheets, may be laid as a film over a conductive engaging element of an electrostatic clutch without need for a binder. Further, the semiconductive polymers exhibit a high degree of stability over time and substantially eliminate the premature wear of prior art devices, caused by dusting of the surfaces.

The invention also provides a novel electrostatic clutch to which the invention semiconductive polymers may be applied in order to produce a highly effective Johnsen-Rahbeck clutch that has a commercially viable service life. The clutch includes inner and an outer nesting cone-shaped electrically conductive engaging clutch plates wherein the outer surface of the inner cone-shaped clutch engages the inner surface of the outer clutch, as shown in FIG. 1. A film of the invention semiconductive polymer system is interposed between the engaging clutch plates. Thus, when a potential difference is applied across the clutch plates, the Johnsen-Rahbeck effect increases the frictional force between these plates enabling the clutch plates to transmit torque, one to the other, so that useful work may be done.

In other arrangements, the semiconductive polymers can be employed between conductive surfaces whereby the Johnsen-Rahbeck effect beneficially provides lateral or axial compression forces on the polymer which can create movement of a valve stem or other device to open or close one or more orifices, or gaps, and the like, such as in a valve or other regulating device.

DETAILED DESCRIPTION OF THE PREFERRED EMBODIMENTS

Figure 1:
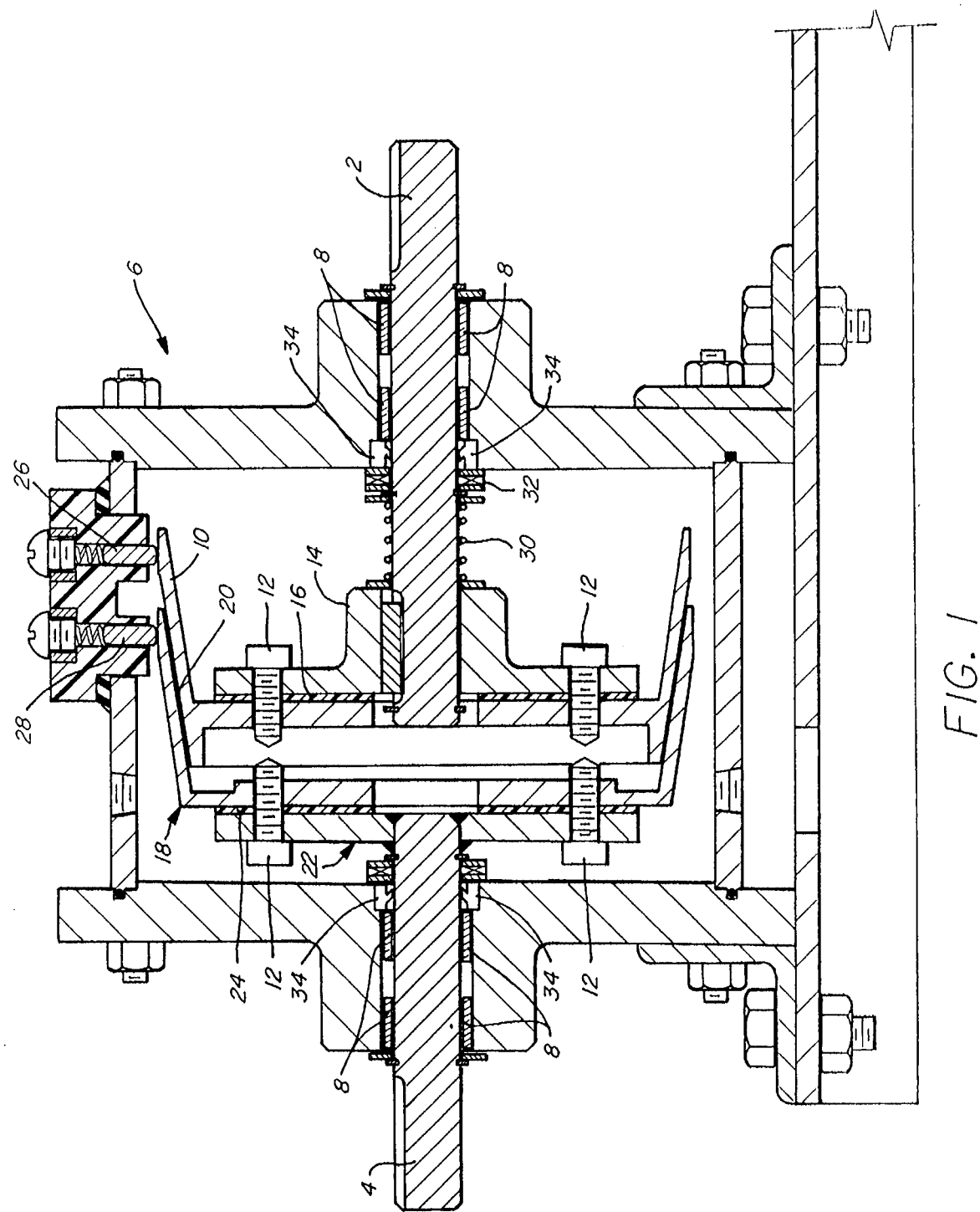
FIG. 1 is a schematic, not-to-scale partial cross-sectional view of an electrostatic clutch using the invention polymeric film and the Johnsen-Rahbeck effect.

The invention provides novel, high purity quaternary amine salts of aliphatic, aromatic or fluorocarbon polymers that have anionic functionality. The invention further provides sheets or films of the quaternary amine polymer matrix that exhibit the Johnsen-Rahbeck effect when used as one of the electrodes in a Johnsen-Rahbeck clutch, or other useful device. The invention also provides salts of polymers containing cationic functionality which may be prepared by combining any anion with a polymer having cationic functionality. It is also envisioned that two polymers, one containing anionic functionality and one containing cationic functionality, could be reacted together to form a Johnsen-Rahbeck active polymer system. The sheets or films fabricated of the invention polymer matrices do not "dust" but are self-healing so that, when used in a clutch device, they are not subject to accelerated wear and offer a useful service life.

1. The Semiconductive Polymer Matrix

The invention quaternary amine salts of polymers containing anionic functionality may be prepared by combining any quaternary amine with a polymer having anionic functionality. However, it is preferred that the functionalized polymer should be of sufficient molecular weight so that once the salt form is produced the resulting polymer matrix is a solid at room temperature. These polymers may be aliphatic or aromatic and may contain halogen in their backbones as long as they possess anionic and/or cationic functionality able to interact with a cation or an anion, respectively.

U.S. Pat. No. 4,661,634 describes the preparation of quaternary acrylate copolymers as intermediates when quaternary ammonium salts are combined by reaction, or ion exchange, with ethylene/acrylic copolymers when the acid groups are in the form of an alkali salt. We have found that the reaction, or ion exchange, of the acid form of ethylene/acid polymers with the hydroxide form of quaternary amines and the alkali salt of ethylene/acid polymers reaction, or ion exchange, with quaternary ammonium salts ($Cl^-$, $Br^-$, $I^-$) both give useful products for Johnsen-Rahbeck applications. In the systems useful in the present invention, it is essential to isolate the quaternary acrylate copolymer and remove substantially all excess quaternary amine or other salt produced in the reaction. Failure to do this results in a polymer matrix which is unsuitable for Johnsen-Rahbeck applications due to excessive conductivity.

U.S. Pat. No. 4,246,091 teaches the treatment of perfluorocarbon sulfonic acid membranes with amines, including quaternary amines, followed by heat treatment and drying to improve the cation selecting performance of the membrane and to increase its current efficiency in a chloralkali process. The heat treatment step plays an important role in the above patent and has as its lower practical limit 100° C. However, treatment at a higher temperature than the fusing point of the base resin material of the membrane, improved by the advanced treatment with amine- or ammonium salt, will deleteriously affect membrane ion exchange performance. Neither of the two above-cited patents conceived of, or understood, the possibility of preparing Johnsen-Rahbeck active polymer systems.

It is important in the preparation of Johnsen-Rahbeck active polymers in the present invention to remove residual reactants and impurities from the newly formed polymer system. Any remaining impurities, which lead to ionic or electronic conduction, will substantially reduce the Johnsen-Rahbeck behavior of the polymer system. Similarly, if too much solvent (aqueous or nonaqueous) remains in the polymer system, the resultant drop in resistivity will adversely affect the Johnsen-Rahbeck behavior of the polymer systems.

The polymer and quaternary amine may be reacted by first grinding the polymer to a particle size that allows a high surface to volume ratio for rapid and substantially complete reaction between the polymer functionality and the amine. To ensure that a significant proportion of the polymer's functionality reacts with the reactant at a useful rate, polymer particle size should be less than about 3 mm. Preferably, the polymer is ground to about 7 microns average particle size, or less. The polymer is then dispersed in a liquid carrier, such as a mixture of water and alcohol, and mixed until all the particles are wetted with the carrier solution. A solution of quaternary amine is then added to the polymer dispersion, while mixing. The reaction should be allowed to continue to completion, typically about 30 minutes to about one hour, depending upon the temperature of reaction. The reaction product, the quaternary amine salt of the polymer, is filtered from the dispersion and rinsed with water. Thereafter, the salt is dried and pressed into a film or sheet of desired thickness under heat and pressure. While thicker or thinner films may be used, it is preferred to use films of thickness from about 0.0006 to about 0.3 mm. to ensure a useful service life when the film is used in a clutch application.

2. The Electrostatic Johnsen-Rahbeck Clutch

The invention polymeric films may be used in a variety of clutches that depend upon the Johnsen-Rahbeck effect. However, a novel useful clutch is shown in FIG. 1. This electrostatic clutch has an input shaft 2 and output shaft 4. One end of the input shaft 2 penetrates the housing 6 of the clutch and is able to rotate on needle bearings 8. The end of the input shaft within the housing is equipped with an input clutch plate 10.

The clutch plate 10 has the shape of a cone section and tapers at an angle Θ of between 6 and 60 degrees, but not less than 2 degrees. The clutch plate 10 is bolted, by insulating bolts 12, to a backing plate which has means to mechanically clamp the clutch 10 to the input shaft. An electrically insulating sheet 16 is sandwiched between the clutch plate 10 and the backing plate 14.

An output shaft 4 penetrates the housing in the same plane as the input shaft 2, but from the opposite end of the housing. The end of the output shaft 4 that penetrates the housing is equipped with an output clutch plate 18 in the shape of a cone section. This output clutch plate 18 is cone-shaped and tapers at an angle Θ corresponding to that of the input clutch so that the inner surface of the output clutch 18 will nest snugly against the outer surface of the input clutch 10. A polymeric film 20 is interposed between these nesting clutch plate surfaces and may be attached to either of these clutch surfaces by processes such as, for example, thermal fusion of the film to the surface, injection molding onto the surface or solvent casting onto the surface. The output clutch plate 18 is immovably attached to the shaft by a backing plate 22 which is electrically insulated from the clutch by an insulating sheet 24. Each clutch plate may be electrically charged by contact with brushes 26 and 28.

When there is no applied potential, the nesting clutch plate surfaces are urged together by a compression spring 30 which surrounds the input shaft 2 and which is in compression between the backing plate 14, at one of its ends, and a thrust bearing 32 at its other end. The thrust bearing 32 abuts against the housing 6.

The space within the housing 6 may be filled up or partially filled with a low dielectric constant, high dielectric strength lubricant/coolant such as mineral oil, silicone oil, and the like. To avoid leakage of this fluid from the clutch at the shaft entrances, suitable seal means 34 are provided. These seal means may be O-rings, lip seals and the like.

When current flows from the carbon brushes to the clutch plates, they acquire an equal, opposite charge. The invention polymeric film 20, sandwiched between the clutch plates, exhibits the Johnsen-Rahbeck effect thereby increasing the frictional force between the nesting, contacting surfaces of the clutch assembly. As a result, when the input shaft 2 is rotated, torque is transferred to the output shaft which then rotates in unison with the input clutch so that useful work may be accomplished. This torque transfer will continue up to the point where a load applied to the output shaft requires a torque that exceeds the frictional forces between the nesting surfaces (i.e. exceeds the Johnsen-Rahbeck frictional effect). At this load, the "limiting load" the clutch plates will disengage and this is the maximum load that the clutch is able to transfer.

The torque bearing capability is proportional to the area of polymeric film provided and the strength of the applied field. Therefore, a larger surface area of polymeric film between the nesting surfaces and increasing the strength of the applied field are both effective in increasing the torque transfer capability of the electrostatic clutch.

As used in this disclosure, the following explanations obtain:

"PFSAP" means perfluorocarbonsulfonic acid polymer.

FREON™ 113 means 1,1,-dichloro, trifluoroethane.

BARQUAT™ 1552, (product of Lonza) comprises about 42% n-alkyl (60% $C_{14}$; 30% $C_{16}$; 5% $C_{12}$; 5% $C_{18}$) and about 8% di-n-alkyl (60% $C_{14}$; 30% $C_{16}$; 5% $C_{12}$; 5% $C_{18}$) quaternary amine mixture in an aqueous solution which also comprises, by weight, about 10% isopropyl alcohol and 40% water.

BARDAC™ 2250 (a product of Lonza) is 50 wt. % of didecyl dimethyl ammonium chloride (molecular weight about 361) solution in alcoholic solvent.

SCRIPSET™ 700 (a product of Monsanto) is a 30 wt. % aqueous solution of a styrene-maleic anhydride copolymer of 120,000 wt. average molecular weight.

PRIMACOR™ 5980 (a Dow product) is an ethylene/acrylic acid copolymer in which the acrylic acid moiety comprises about 20 wt. % of the total copolymer weight.

The following examples serve to illustrate the invention and should not be interpreted as limiting the scope of the invention as described above and claimed herebelow.

EXAMPLE 1

Preparation of Perfluorocarbonsulfonic Acid

Quaternary Amine Salt

A 6 gram (0.007 moles) quantity of fluorosulfonic acid polymer (Dow Fluorosulfonic Acid, "DFSA," 804) is frozen in liquid nitrogen and then ground in a Retsch sample grinder. The powdered material is then sieved through a 60 mesh screen. The powdered polymer is then mixed with 200 cc of FREON® 113 and poured into a attritor for further grinding. After grinding for a total of about 3 hours, a slurry with a polymer average particle size of about 7 microns is obtained. This slurry is collected in a dish and the Freon is evaporated using a nitrogen sweep. The dried powder is placed in a 500 cc beaker and mixed with 150 cc of deionized water and 50 cc of methanol. This mixture is then stirred, with a magnetic stirrer, until all of the solid particles are wet.

A 5.74 grams (0.007 moles) sample of BARQUAT™ 1552 is placed in a beaker along with 100 cc of deionized water. This BARQUAT solution is added to the polymer dispersion and the mixture is allowed to react for about 30 minutes before recovering the particulates on Whatman No. 1 filter paper. The powder obtained is rinsed with deionized water until all the chloride ion is removed. The removal of this acid is qualitatively verified by the addition of a silver nitrate solution to the filtrate and checking for cloudiness. The powder is then placed in a 500 cc beaker along with 150 cc of deionized water and 50 cc of methanol. The addition of BARQUAT 1552, reaction and filtration are repeated a total of three times. Following the final reaction and rinse, the polymer obtained is dried in a vacuum oven for a total of three hours at 120° C. and 30 inches of mercury. Films are then pressed from the dried polymeric particulates.

EXAMPLE 2

Preparation of Ethylene

Acrylic Acid Quaternary Amine Salt

A dispersion is prepared by the addition of 0.2 mole ratio of ammonium hydroxide and 0.1 mole ratio of potassium hydroxide to PRIMACOR™ 5980 resin. This reaction may also be carried out on a standard PRIMACOR™ 5980 resin beads or other ethylene acrylic acid copolymers containing varying amounts of acrylic acid. It is found that the use of extremely small particles of resin in a dispersion dramatically shortens the reaction time required to prepare the quaternary salt of the resin. The resulting ethylene/acrylic acid copolymer quaternary amine salt is a white powder which is easily collected and washed to remove the salt by-product.

In preparing this quaternary amine salt, 80.35 grams (0.089 moles as acrylic acid) of PRIMACOR™ polymer dispersion (40 wt. % solids, 20 wt. % acrylic acid content in the copolymer) is placed in a two liter beaker along with 400 grams of deionized water. A solution containing 72.8 grams (0.089 moles) of BARQUAT™ 1552 and 300 grams of deionized water is prepared and poured into a burette. A 3.55 grams (0.089 moles) sample of sodium hydroxide is then dissolved in 120 cc of deionized water. This solution is poured into a separate burette.

The BARQUAT™ solution is slowly added to the PRIMACOR™ dispersion along with periodic addition of sodium hydroxide in order to keep the pH of the mixture above 6.5. The total addition time of the reactants is 25 minutes and 59 cc of sodium hydroxide is used. Once the addition is complete, the mixture is heated to 32° C. for about 10 minutes and thereafter the pH declined so that an additional 5 cc of the sodium hydroxide solution is added.

The polymer is filtered from the dispersion using Whatman No. 1 filter paper. The white polymeric powder is removed from the filter and washed in a one liter beaker containing 500 cc of deionized water. The solids are then filtered. This washing and filtering procedure is repeated three times. Thereafter, the white solids are washed and filtered in acetone, three times. The resulting powder is then dried under 0.2 mm mercury with gentle warming from an infrared lamp for four hours. Films are then pressed from the dried particulates.

EXAMPLE 3

Performance of a film of Perfluorocarbonsulfonate Quaternary Amine Salt

Figure 2:
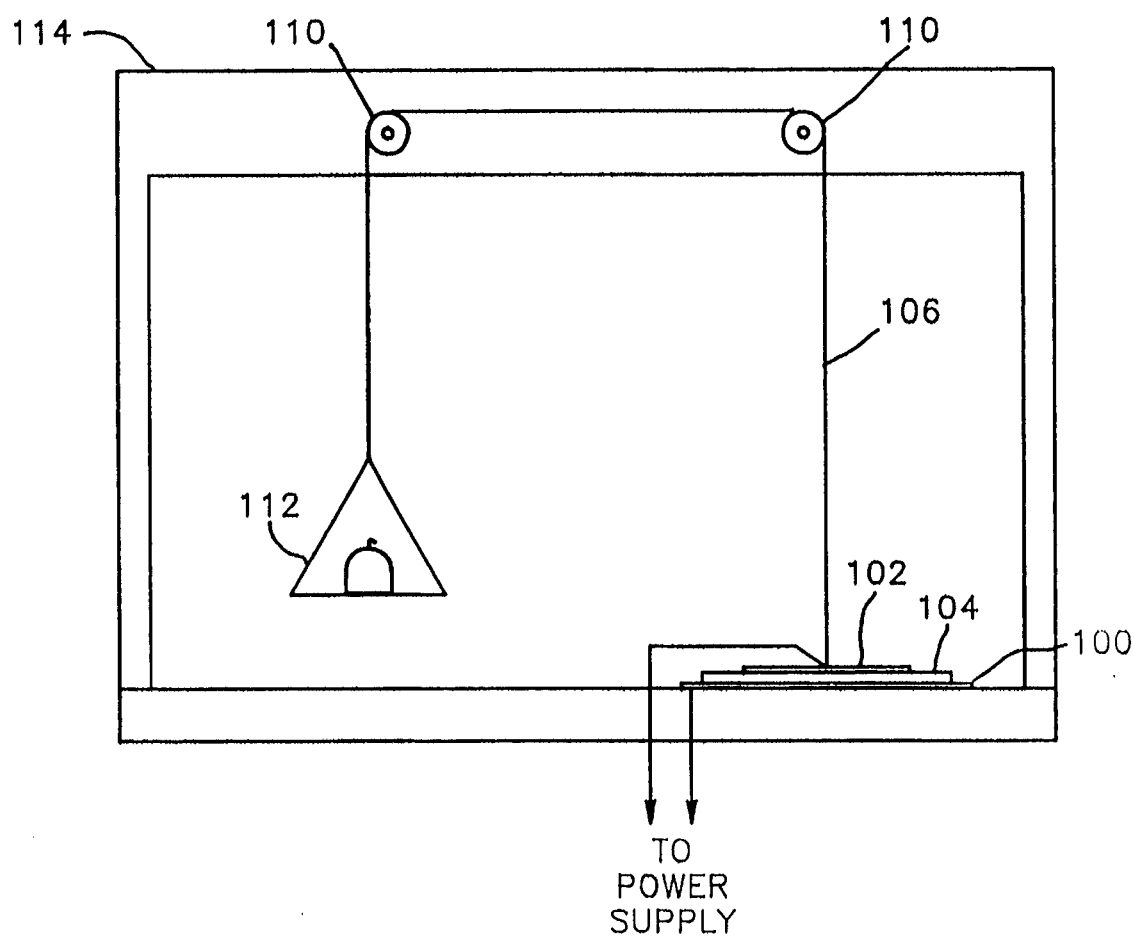
FIG. 2 illustrates a test apparatus for measuring the Johnsen-Rahbeck effect.

A film of 0.0085 inches (0.22 mm) thickness is pressed from the dried polymeric particles of Example 1 and placed between the plates of the test apparatus illustrated in FIG. 2. The apparatus has a bottom fixed plate 100 connected to a power supply. A moveable top plate 102, also connected to a power supply, rests on the bottom plate 100. A film of polymer 104 is sandwiched between the plates 100 and 102. An insulating cable 106 is attached to the upper surface of the top plate 102, passes over two pulleys 110, and terminates in a scale pan 112 for holding weights. The entire apparatus is attached to a wooden frame 114. To determine the limiting load of any polymeric film, at a given potential difference, the film is sandwiched between plates 100 and 102 and a potential difference is applied across the plates. Weights are added to the scale pan 112 until the plates separate. The difference between this weight and the weight required to separate the plates without an applied potential difference, is the actual limiting load. Unless otherwise indicated, this apparatus is used in the Examples to test for limiting load.

The film of this example covered an area of 3.06 in$^2$ (1976 mm$^2$). The results, shown in Table I, demonstrate that an increase in applied voltage leads to an increase in the force needed to separate the plates.

TABLE I

| Voltage (V) | Current (µA) | Limiting Load (g) |
| --- | --- | --- |
| 0 | 0 | 70 |
| 500 | 5.8 | 1,250 |
| 1,000 | 12.3 | >3,000* |

*3,000 grams is the maximum weight the system can measure

EXAMPLE 4

Comparison of Composite (Polymer-Foil-Polymer) Film with Polymer Film

Three films are pressed from the polymer matrix composition produced in Example 2. Two of these films are 0.0065 inches (0.105 mm) in thickness and 3.06 mm$^2$ (1976 mm$^2$) in area, while the other is 0.0085 inches (0.22 mm) thick and of the same area. An aluminum foil, 0.0012 inches (0.0305 mm) thick, is sandwiched by thermal fusion between the two thinner polymer films to form a composite 0.010 inches (0.25 mm) thick. The single polymer film and the composite film are then each in turn placed between the plates of the test apparatus. For each film the limiting load that the plate could tolerate, at a given applied voltage before disengaging, is measured. The results, shown in Table II, show that the composite film has enhanced performance over the single film although the degree of enhancement tends to decline with increase in applied voltage.

TABLE II

| Voltage (V) | Current (µA) | Limiting Load (g) | |
|---|---|---|---|
| | | Single | Composite |
| 0 | 0 | 50 | |
| | 0 | | 50 |
| 500 | 5 | 280 | |
| | 2 | | 180 |
| 1,000 | 15 | 550 | |
| | 13 | | 1,050 |
| 1,500 | 27 | 730 | |
| | 25 | | 1,550 |
| 2,000 | 40 | 1,180 | |
| | 41 | | 2,000 |
| 2,500 | 52 | 1,560 | |
| | 63 | | 2,510 |
| 3,000 | 69 | 2,100 | |
| | 85 | | 2,800 |

EXAMPLE 5

Performance Of An Ethylene/Acrylic Acid Polymer Amine Salt

Film Fused to Bottom Plate of Test Apparatus

A polymer matrix powder is prepared using the method of Example 2 but substituting BARDAC™ 2250 for the BARQUAT™ 1552. The powder is pressed to produce a film 0.0092 inches (0.234 mm) in thickness and 3.06 in² (1976 mm²) in area. The film is then thermally fused to the bottom plate of the test apparatus (see FIG. 2). A potential difference is applied across the plates and the weight required to separate the plates is measured. The results, show in Table III, indicate that there is no need for a binder to affix the film to the plate; thermal fusing is highly effective. It is also observed that adhesion of the polymer to the plates does not decrease with time.

TABLE III

| Voltage (V) | Current (µA) | Limiting Load (g) |
|---|---|---|
| 0 | 0 | 70 |
| 500 | 3.0 | 1,100 |
| 1,000 | 8.2 | 2,150 |
| 1,500 | 14.5 | 2,900 |
| 2,000 | exceeded system measuring capability | |

EXAMPLE 6

Effect of Quaternary Amine Molecular Weight

A powdered polymeric product is obtained by following the method of Example 2 but substituting 8.14 g of a tetramethylammonium hydroxide for the BARQUAT™ 1552 and not adding sodium hydroxide. The tetramethylammonium hydroxide has a molecular weight of about 91 versus about 410 for BARQUAT™ 1552 and about 360 for BARDAC™ 2250. A film, 0.0035 inches (0.089 mm) thick and 3.06 in² (1976 mm²) in area, is pressed from the powdered quaternary amine salt of the ethylene/acrylic acid copolymer and placed between the plates of the test apparatus. Various potential differences are applied across the plates and the limiting loads are measured on the test apparatus and recorded, as shown in Table IV.

TABLE IV

| Voltage (V) | Current (µA) | Limiting Load (g) |
|---|---|---|
| 0 | 0 | 70 |
| 500 | 0.1 | 85 |
| 1,000 | 0.6 | 550 |
| 1,500 | 1.6 | 1,200 |
| 2,000 | 3.2 | 1,550 |
| 2,500 | 6.0 | 2,300 |
| 3,000 | exceeded system measuring capability | |

EXAMPLE 7

Aromatic Polymer Based Film

A film is prepared, by the method of Example 1, but substituting 0.625 g of a maleic anhydride polymer, SCRIPSET™ 700, for the polymer. This film, 0.0085 in (0.22 mm) thick an 3.06 in² (1976 mm²) in area, is placed between the plates of the test apparatus. The limiting load is measured at various applied potential differences and recorded in Table V.

TABLE V

| Voltage (V) | Current (µA) | Limiting Load (g) |
|---|---|---|
| 0 | 0 | 20 |
| 500 | 0.8 | 250 |
| 1,000 | 3.3 | 1,000 |
| 1,500 | 8.7 | 1,500 |

The invention has been described with reference to its preferred embodiments. A person having ordinary skill in the art may, upon reading this disclosure, appreciate certain modifications which are within the scope and spirit of the invention as disclosed above and claimed herebelow.

What is claimed is:

1. An electrically energizable clutch comprising closely adjacent electrically-conductive rotatable surfaces which are at least substantially co-extensively very closely spaced apart in relationship of one to the other;

at least one of said conductive surfaces having affixed thereto a film or layer of a substantially pure polymer having polarizable salt groups to thereby exhibit a Johnsen Rahbeck effect, said polymer being in nonaffixed contact with the other conductive surface; and having electrical circuitry for creating an electric field between the conductive surfaces whereby, upon energizing the circuitry, one of the the conductive surfaces becomes anodic and the other surface becomes cathodic.

2. The clutch of claim 1 wherein the polymer comprises a polymer having anionic groups which have been reacted with cationic groups to form polarizable salt groups.

3. The clutch of claim 1 wherein the polymer comprises a polymer having cationic groups which have been reacted with anionic groups to form polarizable salt groups.

4. An apparatus comprising: conductive surfaces separated from each other by a film or layer of polymer having polarizable salt groups to thereby provide a film or layer of polymer having a Johnsen Rahbeck effect, said film or layer of polymer being confined between the conductive surfaces; and said conductive surfaces being provided with electrical circuitry for creating an electric field between the said surfaces and whereby, upon energizing the circuitry, one of the conductive surfaces becomes anodic and the other becomes cathodic.

5. The apparatus of claim 4 wherein the polymer comprises a polymer having anionic groups which have been reacted with cationic groups to form polarizable salt groups.

6. The apparatus of claim 4 wherein the polymer comprises a polymer having cationic groups which have been reacted with anionic groups to form polarizable salt groups.

* * * * *